(12) United States Patent
Schmalz et al.

(10) Patent No.: US 8,096,438 B2
(45) Date of Patent: Jan. 17, 2012

(54) FUEL TANK CAP FOR A FUEL TANK

(75) Inventors: Jacob Schmalz, Milwaukee, WI (US); John Gulke, Fond du Lac, WI (US); Peter D. Shears, Wauwatosa, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 367 days.

(21) Appl. No.: 12/132,436

(22) Filed: Jun. 3, 2008

(65) Prior Publication Data

US 2009/0294450 A1 Dec. 3, 2009

(51) Int. Cl.
*B65D 51/16* (2006.01)
*B65D 25/04* (2006.01)
*B65D 1/36* (2006.01)

(52) U.S. Cl. .................. 220/371; 220/86.2; 220/367.1; 220/368; 220/374; 220/521

(58) Field of Classification Search .................. 220/86.2, 220/367.1, 368, 371, 374, 521
See application file for complete search history.

(56) References Cited

U.S. PATENT DOCUMENTS

| | | |
|---|---|---|
| 1,509,796 A | 9/1924 | Tokuhisa |
| 1,518,467 A | 12/1924 | Van Pelt |
| 1,543,256 A | 6/1925 | Grant |
| 1,841,691 A | 1/1932 | Wilson |
| 2,061,958 A | 11/1936 | Chapman |
| 2,095,460 A | 10/1937 | Swords |
| 2,428,426 A | 10/1947 | Lindsay |
| 2,555,199 A | 5/1951 | Meyerhoefer |
| 2,603,308 A | 7/1952 | McCall |
| 2,626,678 A | 1/1953 | Yant |
| 2,663,456 A | 12/1953 | Schultz et al. |
| 2,675,093 A | 4/1954 | McCall et al. |
| 3,451,584 A | 6/1969 | Degaetano |
| 3,546,853 A | 12/1970 | Claar |
| 3,748,829 A | 7/1973 | Joyce et al. |
| 3,815,752 A | 6/1974 | Hoffman et al. |

(Continued)

FOREIGN PATENT DOCUMENTS

CA    1107528    8/1981

(Continued)

OTHER PUBLICATIONS

Extended European Search Report for corresponding European Application No. 09161433.9.

(Continued)

*Primary Examiner* — Anthony Stashick
*Assistant Examiner* — Madison L Wright
(74) *Attorney, Agent, or Firm* — Michael Best & Friedrich LLP

(57) ABSTRACT

A fuel tank cap for a fuel tank of an engine. The fuel tank cap includes a fuel cap cover, a housing having a side wall, a bottom wall, and a receptacle, a fuel vapor adsorption material positioned within the receptacle, an inlet disposed near the bottom wall and configured to provide fluid communication with a fuel tank vapor space, an outlet disposed near the bottom wall and configured to provide fluid communication with the atmosphere, an internal wall adjacent the bottom wall and disposed between the inlet and the outlet, and at least one aperture configured to permit fuel vapor to flow in a vapor flow path from one side of the internal wall to the other side of the internal wall.

33 Claims, 11 Drawing Sheets

U.S. PATENT DOCUMENTS

| | | | |
|---|---|---|---|
| 3,961,724 A | 6/1976 | Kapsy | |
| 4,028,075 A | 6/1977 | Roberge | |
| 4,091,179 A * | 5/1978 | Szabo | 429/84 |
| 4,320,853 A | 3/1982 | Moore | |
| 4,350,508 A | 9/1982 | Santoro et al. | |
| 4,416,108 A | 11/1983 | Ghandhi | |
| 4,512,499 A | 4/1985 | Uuskallio | |
| 4,572,394 A | 2/1986 | Tanahashi et al. | |
| 4,646,701 A | 3/1987 | Fukumoto | |
| 4,694,870 A | 9/1987 | Vize | |
| 4,696,409 A | 9/1987 | Vize | |
| 4,867,337 A | 9/1989 | Eichenseer | |
| 4,884,716 A | 12/1989 | Steiner | |
| 4,900,346 A | 2/1990 | Lutz | |
| 5,042,678 A | 8/1991 | Munguia | |
| 5,058,693 A | 10/1991 | Murdock et al. | |
| 5,242,072 A | 9/1993 | Koebernik | |
| 5,299,545 A | 4/1994 | Kuroda et al. | |
| 5,345,917 A | 9/1994 | Maruyama et al. | |
| 5,349,934 A | 9/1994 | Miyano | |
| 5,355,863 A | 10/1994 | Yamanaka et al. | |
| 5,355,864 A | 10/1994 | Kuroda et al. | |
| 5,395,428 A | 3/1995 | von Blucher et al. | |
| 5,398,662 A | 3/1995 | Igarashi et al. | |
| 5,427,076 A | 6/1995 | Kobayashi et al. | |
| 5,456,236 A | 10/1995 | Wakashiro et al. | |
| 5,460,136 A | 10/1995 | Yamazaki et al. | |
| 5,487,369 A | 1/1996 | Hara et al. | |
| 5,538,542 A | 7/1996 | Hideo et al. | |
| 5,538,543 A | 7/1996 | Hideo et al. | |
| 5,678,523 A | 10/1997 | Hashimoto et al. | |
| 5,680,848 A | 10/1997 | Katoh et al. | |
| 5,765,539 A | 6/1998 | Isobe et al. | |
| 5,775,307 A | 7/1998 | Isobe et al. | |
| 5,803,054 A | 9/1998 | Yamazaki et al. | |
| 6,023,023 A | 2/2000 | Takeuchi | |
| 6,085,922 A * | 7/2000 | Esser | 215/331 |
| 6,274,209 B1 | 8/2001 | Pagidas et al. | |
| 6,305,362 B1 | 10/2001 | Kitamura et al. | |
| 6,330,879 B1 | 12/2001 | Kitamura et al. | |
| 6,336,446 B1 | 1/2002 | Isobe et al. | |
| 6,347,617 B1 | 2/2002 | Kitamura et al. | |
| 6,605,135 B2 | 8/2003 | Lee et al. | |
| 6,698,611 B2 | 3/2004 | Matsubara et al. | |
| 6,866,056 B1 | 3/2005 | Scott | |
| 7,047,948 B2 | 5/2006 | Gerhardt et al. | |
| 7,086,389 B2 | 8/2006 | Yamada | |
| 7,104,258 B2 | 9/2006 | Yamada et al. | |
| 7,261,093 B2 | 8/2007 | Groom et al. | |
| 7,267,112 B2 | 9/2007 | Donahue et al. | |
| 7,293,629 B2 | 11/2007 | Nasuno et al. | |
| 7,311,088 B1 | 12/2007 | Callahan et al. | |
| 7,320,314 B2 | 1/2008 | Kashima et al. | |
| 2003/0075156 A1 | 4/2003 | Morinaga et al. | |
| 2003/0094456 A1 | 5/2003 | Yasunori et al. | |
| 2003/0098307 A1 | 5/2003 | Hagano et al. | |
| 2003/0173362 A1 | 9/2003 | Ishida et al. | |
| 2003/0234254 A1* | 12/2003 | Grybush et al. | 220/366.1 |
| 2004/0129706 A1 | 7/2004 | Hagano et al. | |
| 2004/0154670 A1 | 8/2004 | Gerhardt et al. | |
| 2004/0256392 A1 | 12/2004 | Hagano et al. | |
| 2005/0003095 A1 | 1/2005 | Griffin et al. | |
| 2005/0072728 A1 | 4/2005 | Chang | |
| 2006/0011173 A1 | 1/2006 | Davis et al. | |
| 2006/0016436 A1 | 1/2006 | Groom et al. | |
| 2006/0037959 A1 | 2/2006 | Hokazono et al. | |
| 2006/0086738 A1 | 4/2006 | Dehn et al. | |
| 2006/0185742 A1 | 8/2006 | Hiromi | |
| 2006/0266338 A1 | 11/2006 | Kashima et al. | |
| 2007/0068388 A1 | 3/2007 | Shears et al. | |
| 2007/0108212 A1* | 5/2007 | Nelson | 220/371 |
| 2007/0151628 A1 | 7/2007 | Thompson | |
| 2007/0261679 A1 | 11/2007 | Tschantz | |
| 2008/0011388 A1 | 1/2008 | Wu | |
| 2008/0110889 A1 | 5/2008 | Ohsawa et al. | |

FOREIGN PATENT DOCUMENTS

| | | |
|---|---|---|
| CA | 2248502 | 3/1999 |
| CN | 1718464 | 1/2006 |
| EP | 1726815 A2 | 11/2006 |
| GB | 1394015 | 5/1975 |
| GB | 1395744 | 5/1975 |
| GB | 2337252 | 11/1999 |
| JP | 55143263 | 11/1980 |
| JP | 58180147 U | 12/1983 |
| JP | 60104756 | 6/1985 |
| JP | 62034874 | 2/1987 |
| JP | 5240116 | 9/1993 |
| JP | 6040462 | 2/1994 |
| JP | 6042415 | 2/1994 |
| JP | 6221234 | 8/1994 |
| JP | 6280694 | 10/1994 |
| JP | 7034985 | 2/1995 |
| JP | 7103084 | 4/1995 |
| JP | 7174050 | 7/1995 |
| JP | 7187040 | 7/1995 |
| JP | 7189823 | 7/1995 |
| JP | 7293365 | 11/1995 |
| JP | 8004605 | 1/1996 |
| JP | 8121263 | 5/1996 |
| JP | 8295143 | 11/1996 |
| JP | 9112356 | 4/1997 |
| JP | 9193674 | 7/1997 |
| JP | 9267783 | 10/1997 |
| JP | 10236366 | 9/1998 |
| JP | 10281019 | 10/1998 |
| JP | 10297664 | 11/1998 |
| JP | 11028941 | 2/1999 |
| JP | 11125154 | 5/1999 |
| JP | 11278070 | 10/1999 |
| JP | 2002144894 | 5/2002 |
| JP | 2002266709 | 9/2002 |
| JP | 2003083500 | 3/2003 |
| JP | 2003237388 | 8/2003 |
| JP | 2004316547 | 11/2004 |
| JP | 2004360540 | 12/2004 |
| JP | 2005053337 | 3/2005 |
| JP | 2005178487 | 7/2005 |
| JP | 2005178488 | 7/2005 |
| JP | 2006021599 | 1/2006 |
| JP | 2006056454 | 3/2006 |
| JP | 2006328985 | 12/2006 |
| JP | 2007001616 | 1/2007 |
| WO | 2006137521 | 12/2006 |

OTHER PUBLICATIONS

Fuel cap for Honda GX200 Model engine, commercially available at least as early as Aug. 2007.

* cited by examiner

FUEL TANK CAP FOR A FUEL TANK

BACKGROUND

The present invention relates to a fuel tank cap for capturing evaporative emissions from fuel tanks or other engine components.

Internal combustion engines are often used to power small equipment such as lawnmowers, tillers, snow throwers, lawn tractors and the like. The fuel system includes a tank, in which fuel is stored for use. Generally, the volatility of the fuel allows a portion of the fuel to evaporate and mix with air within the tank. Changes in temperature, such as those between evening and daytime, as well as sloshing during use can cause an increase or a decrease in the amount of fuel vapor in the tank as well as an increase or a decrease in the pressure within the tank.

To deal with the fuel vapor, the fuel tank cap often includes a filtering element. The filtering element filters the fuel vapor from the air to substantially reduce or eliminate any fuel vapor emissions from the fuel system.

SUMMARY

In one embodiment, the invention provides a fuel tank cap for a fuel tank of an engine. The fuel tank cap includes a fuel cap cover, a housing having a side wall, a bottom wall, and a receptacle, a fuel vapor adsorption material positioned within the receptacle, an inlet disposed near the bottom wall and configured to provide fluid communication with a fuel tank vapor space, an outlet disposed near the bottom wall and configured to provide fluid communication with the atmosphere, an internal wall adjacent the bottom wall and disposed between the inlet and the outlet, and at least one aperture configured to permit fuel vapor to flow in a vapor flow path from one side of the internal wall to the other side of the internal wall.

In another embodiment, the invention provides a fuel tank cap for a fuel tank of an engine. The fuel tank cap includes a fuel cap cover, a housing having a side wall, a bottom wall, and a receptacle, a fuel vapor adsorption material positioned within the receptacle, a fuel vapor inlet disposed near the bottom wall and configured to provide fluid communication with a fuel tank vapor space, an outlet disposed near the bottom wall and configured to provide fluid communication with the atmosphere, an internal wall adjacent the bottom wall and disposed between the inlet and the outlet, the internal wall creating a first region on one side of the internal wall and a second region on an other side of the internal wall, and at least one aperture configured to permit fuel vapor to flow in a fuel vapor flow path from the first region to the second region.

In another embodiment, the invention provides a fuel tank cap for a fuel tank of an engine. The fuel tank cap includes a housing having a bottom wall, a receptacle formed in the housing, an inlet disposed near the bottom wall and configured to provide fluid communication with a fuel tank vapor space, an outlet disposed near the bottom wall and configured to provide fluid communication with the atmosphere, a fuel vapor adsorption material positioned within the receptacle, an internal wall extending into the receptacle and disposed between the inlet and the outlet, and at least one aperture configured to permit fuel vapor to flow from one side of the internal wall to the other side of the internal wall. The internal wall is configured to direct fuel vapor through the longest volume of the fuel vapor adsorption material in a fuel vapor flow path.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
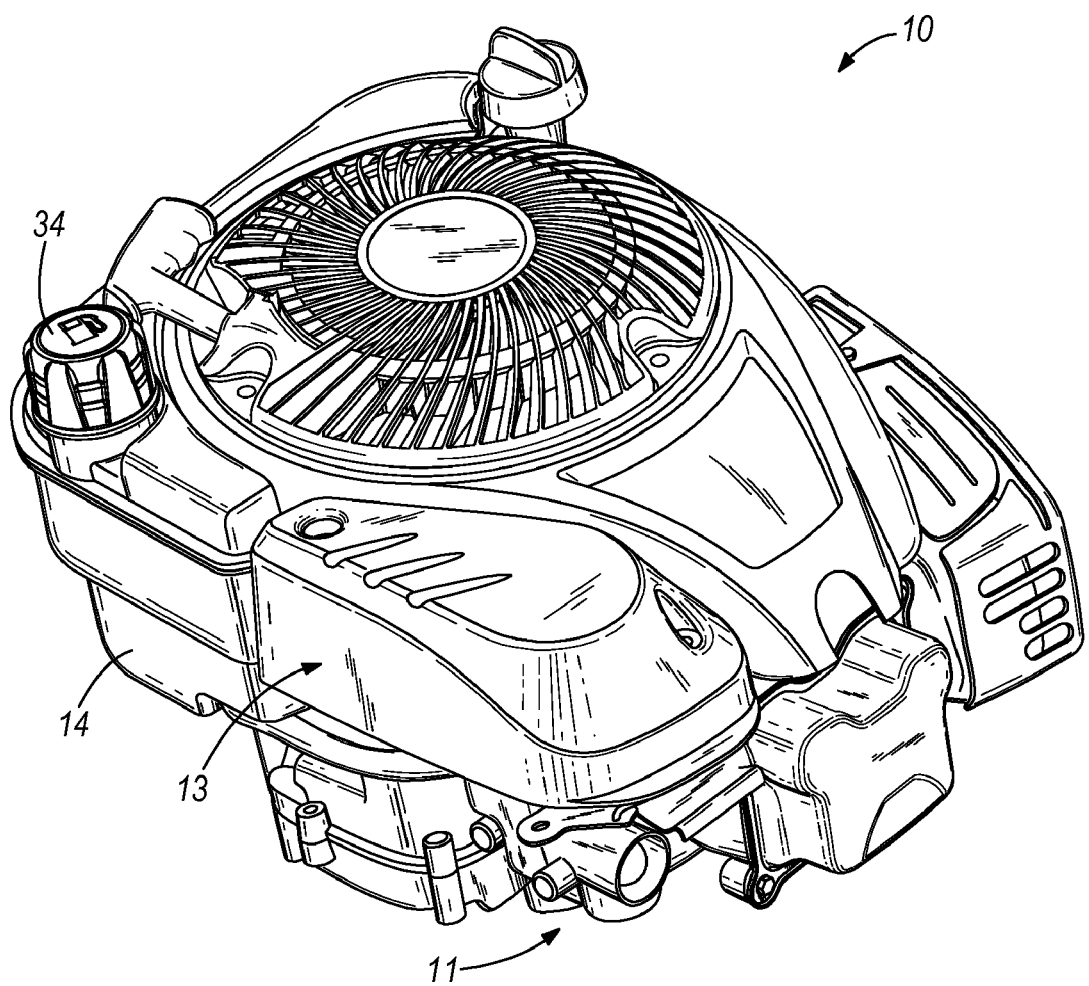
FIG. 1 is a perspective view of an engine including the fuel tank cap of the present invention.

With reference to FIG. 1, an engine assembly 10 is illustrated. To properly operate the engine assembly 10, the engine assembly 10 includes a fuel tank 14, an air-fuel mixing device 11 and an air cleaner assembly 13. Generally, the air-fuel mixing device 11 includes a carburetor, but it could also be a throttle body or other component of a fuel injection system. The engine is similar to engines of a type that are often used to power outdoor power equipment such as lawnmowers, garden tractors, snow throwers, tillers, pressure washers, generators, and the like.

Typically, the fuel tank 14 is sized based on the size of the engine and the task to be performed by the device to which the engine and the fuel tank are attached. Thus, a variety of fuel tank sizes are available. As one of ordinary skill in the art will realize, several fuel tanks of different sizes can be used with engines. As such, the invention described herein should not be limited to use with fuel tanks sized as described herein. Rather, the invention is applicable to different fuel tanks in addition to those discussed. However, it should be understood that embodiments of the invention using fuel vapor adsorption material may be limited practically to engines using smaller fuel tanks, due to the practical size limitations of the fuel vapor adsorption material for large fuel tanks, such that as the size of the fuel tank increases, the size of the fuel vapor adsorption material increases accordingly. The fuel tank 14 can be formed by a plurality of materials, including, but not limited to, plastic, metal, composite, and the like. Manufacturing processes available to form the fuel tank include, but are not limited to vacuum-forming, roto-molding, blow-molding, injection molding and the like.

Figure 3:
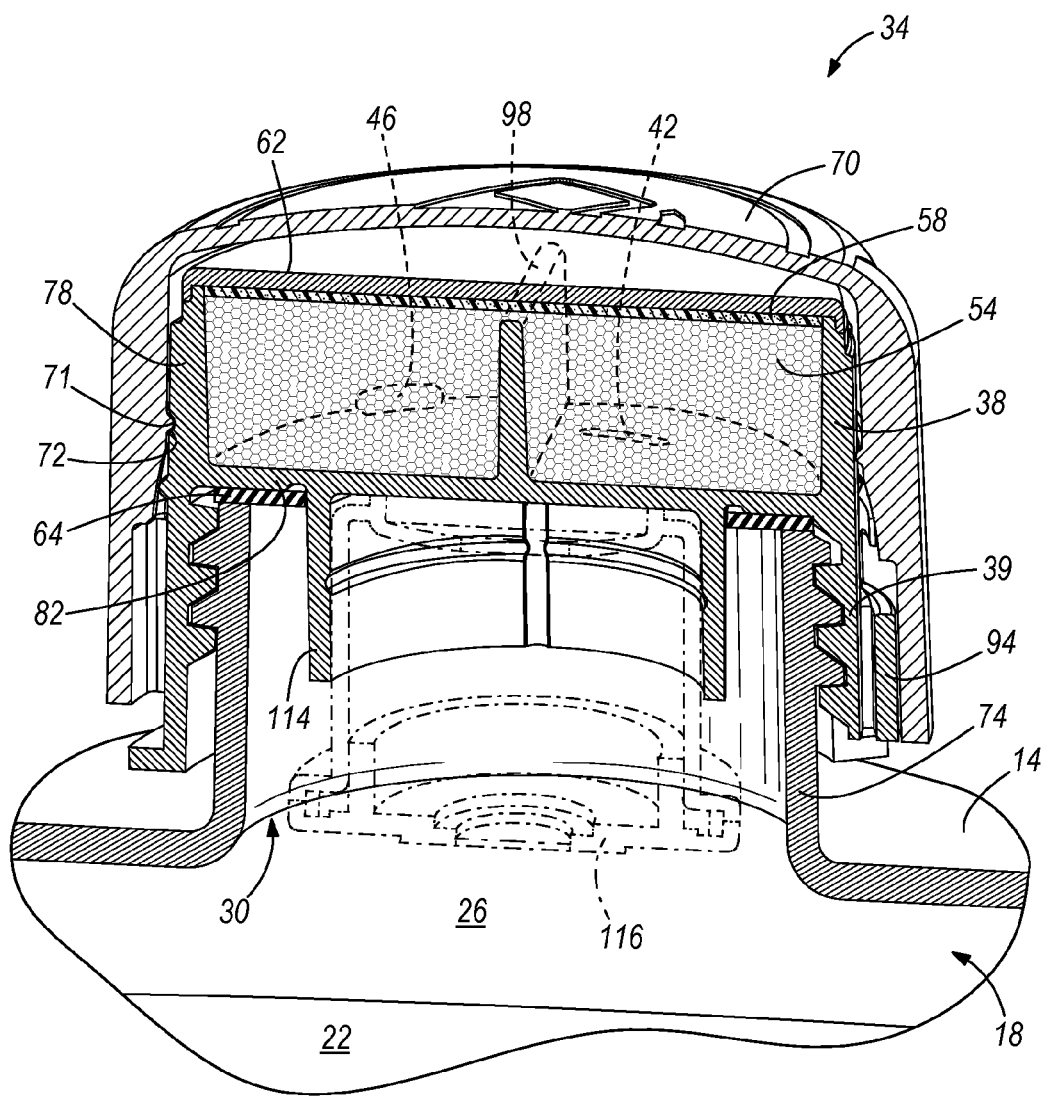
FIG. 3 is a cross-sectional view of the fuel tank cap of FIG. 2.
Figure 9:
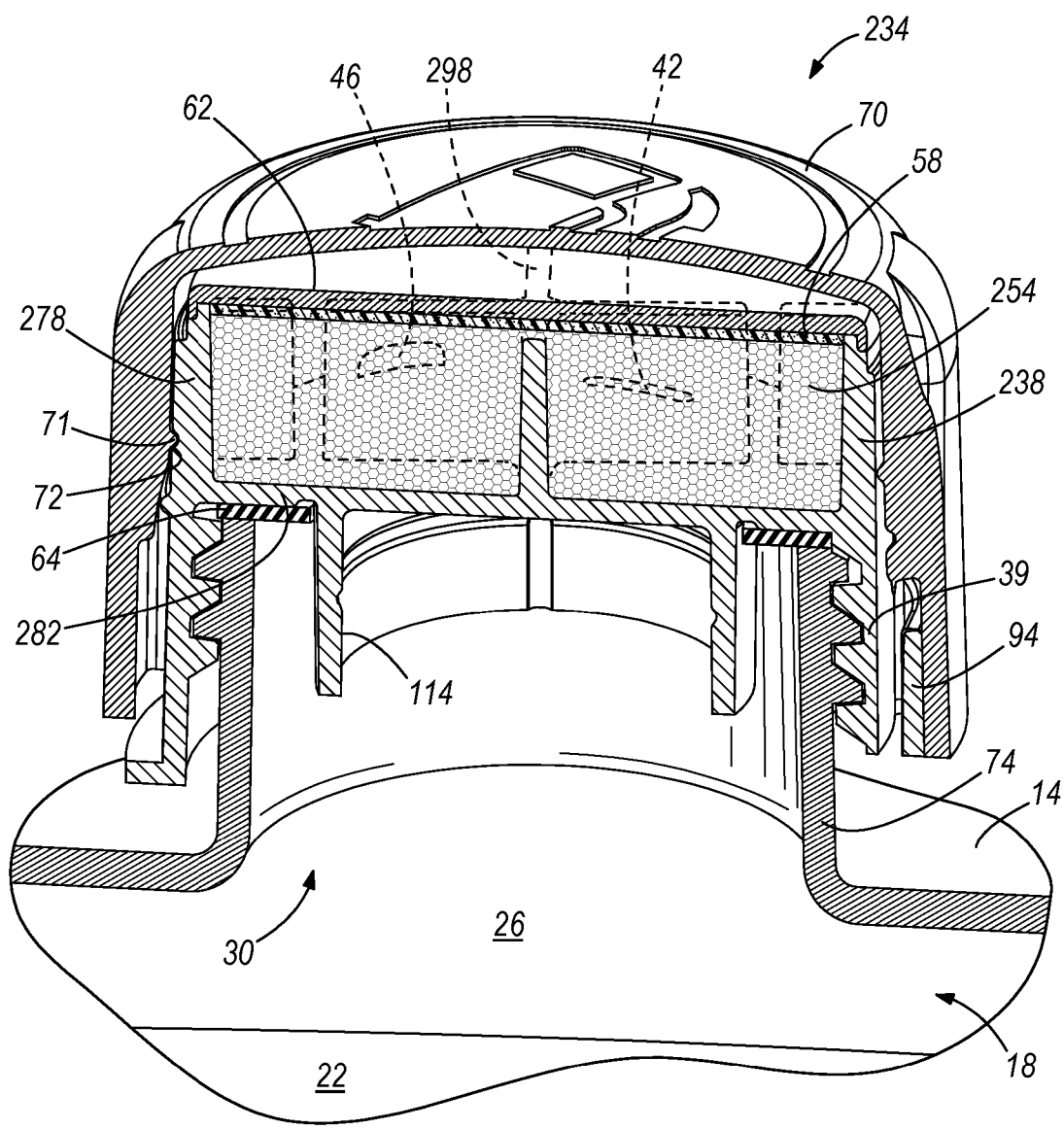
FIG. 9 is a cross-sectional view of the fuel tank cap of FIG. 8.

As shown in FIGS. 3 and 9, the fuel tank 14 further includes a fuel tank reservoir 18. The fuel tank reservoir 18 is integrally-formed with the top portion of the fuel tank 14. Fuel 22 is retained in the fuel tank 14, and fuel vapor 26 exists above the fuel 22 in the fuel tank 14 in the fuel tank vapor space 30.

Figure 2:
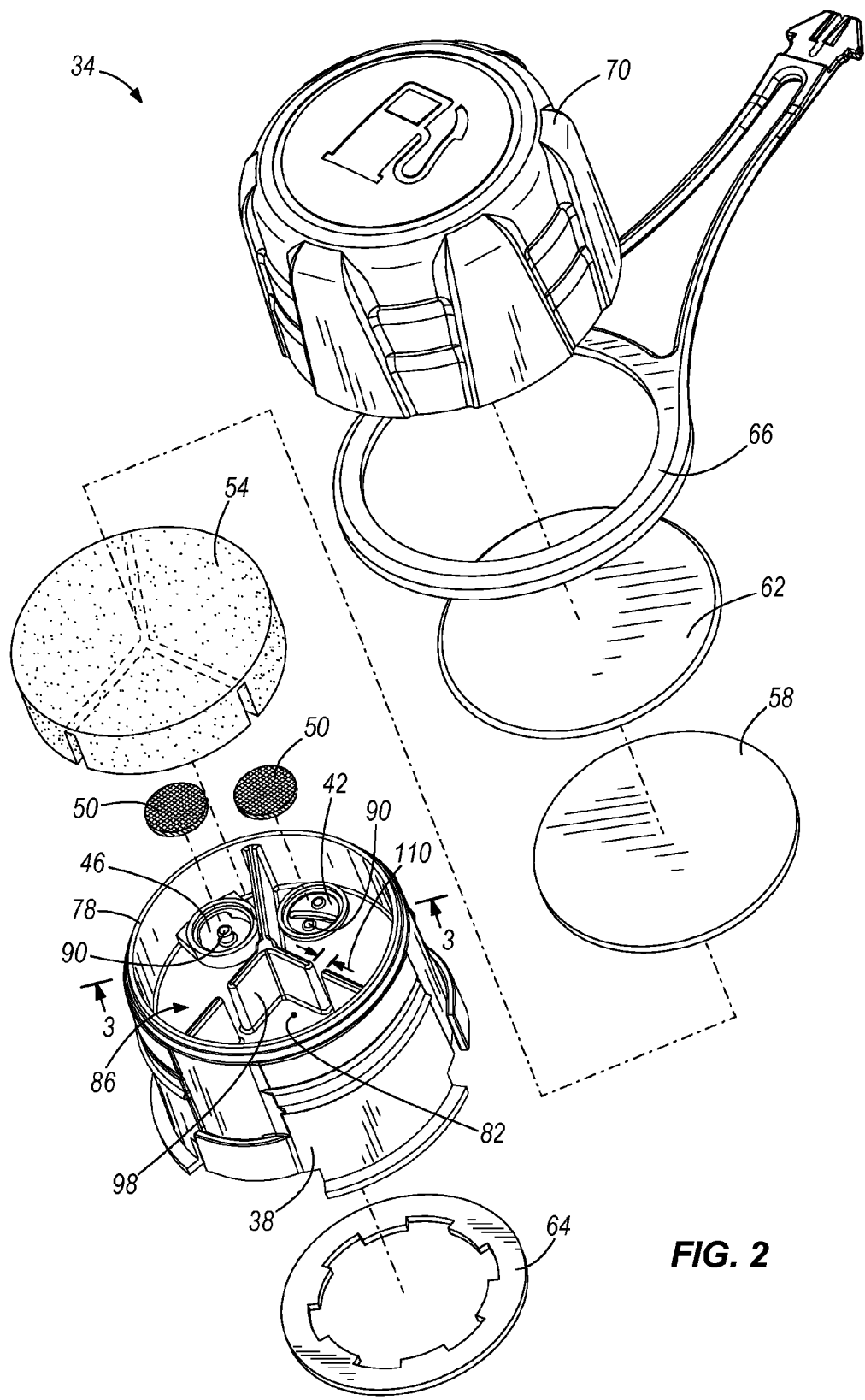
FIG. 2 is an exploded perspective view of one embodiment of the fuel tank cap of present invention.

FIGS. 2 through 7 illustrate one embodiment of the fuel cap 34 of the present invention. FIG. 2 shows an exploded view of the fuel cap 34. The fuel cap 34 includes a housing 38, an inlet 42, an outlet 46, a plurality of screens 50, fuel vapor adsorption material 54, a compression foam 58, a receptacle cover 62, a sealing gasket 64, a tether 66, and a cap cover 70. As shown in FIG. 3, the fuel tank cap housing 38 is coupled with the filler neck 74 of the fuel tank 14 via threads 39. However, in other embodiments, the fuel tank cap may have a snap-on configuration, push-on connection or similar connection. Gasket 64 creates a fluid tight seal between the fuel tank housing 38 and filler neck 74. The gasket 64 is configured to allow for compression fit with the housing 38 and fluid access to the inlet 42.

As shown in FIGS. 2 through 7, the housing 38 has a side wall 78 and a base wall 82. The housing 38 is formed of materials such as acetyl, nylon, polypropylene, and like material. The housing 38 is preferably, among other things, a fuel-resistant, low resitivity, impact resistant material. The inlet 42 is substantially positioned on the base wall 82 and configured to provide fluid communication with the fuel tank vapor space 30 (see FIG. 5). The outlet 46 is positioned on the base wall 82 and configured to provide fluid communication with the atmosphere (see FIG. 5). Screens 50 are positioned on a receptacle side of both the inlet 42 and outlet 46 to prevent the fuel vapor adsorption material 54 from interfering with either of the inlet 42 or the outlet 46. The screens 50 are open-mesh and sized based on the carbon pellet size of the fuel vapor adsorption material 54. In other embodiments, the screens can be any shape to match the size and shape of the inlet and the outlet. The inlet 42 and outlet 46 both include at least one stand-off 90 configured to keep the screens 50 in position and to protect the inlet 42 and outlet 46 from any compressive forces applied to the system. The fuel vapor adsorption material 54 is retained in the receptacle 86 of the housing 38. In the illustrated embodiment of FIGS. 2 and 3, the fuel vapor adsorption material 54 is carbon. In other embodiments, the fuel vapor adsorption material can be another adsorption material capable of adsorbing fuel vapor.

The compression foam 58 is positioned adjacent the fuel vapor adsorption material 54 and retains the fuel vapor adsorption material 54 in the receptacle 86. The compression foam 58 substantially compresses the fuel vapor adsorption material 54 along all axes. The compression foam 58 provides abrasion resistance so that the fuel vapor adsorption material 54 does not degrade by rubbing against itself or a hard surface. Furthermore, the compression foam 58 creates a seal over the receptacle 86 to prevent fuel vapor from bypassing the vapor adsorption material 54. The compression foam 58 is a low durometer, closed-cell elastomer. In other embodiments, the compression foam can be other types of foam, elastomeric material, or rubber material.

The receptacle cover 62 is positioned adjacent the compression foam 58 and retains the compression foam 58 in the receptacle 86. The receptacle cover 62 is coupled to the fuel cap housing 38 with a material weld. In other embodiments, alternative joining methods may be used, including but not limited to, gluing or snap fits. The tether 66 is adapted to allow the fuel tank cap 34 to be removably attached to the filler neck 74 extending from the fuel tank 14, and attached so that the fuel tank cap 34 remains coupled to the fuel tank 14 to prevent loss of the fuel tank cap 34 when it is removed from the filler neck 74 of the fuel tank 14 during refueling. The fuel tank cap cover 70 is configured to be positioned over the fuel cap housing 38. As shown in FIG. 3, the fuel tank cap cover 70 is retained on the cap housing 38 by interlocking ribs 71 and grooves 72. The cap housing 38 includes protrusions 94 extending from the cap housing 38 and configured to provide a ratchet function (see FIG. 7). By rotating the fuel tank cap cover 70 at a predefined torque, the fuel tank cap cover 70 will engage the cap housing 38 by interlocking with the protrusions 94 on the cap housing 38. Once engaged, the fuel tank cap cover 70 and the cap housing 38 will resist movement in the opposite direction, thereby preventing the fuel tank cap cover 70 from being over-tightened.

The fuel cap 34 can further include an optional mounting device or apparatus 114 for any additional apparatus to be coupled to the fuel cap 34. By way of example only, the additional apparatus may include a fuel additive capsule 116 (see FIG. 3), containing fuel stabilizer, as described and illustrated in detail in U.S. Pat. No. 6,942,124 and U.S. Pat. No. 6,981,532, which are incorporated herein by reference. If a fuel stabilizer capsule is included in mounting apparatus 114, the capsule 116 is designed to automatically drip a small quantity of a fuel stabilizer liquid into the fuel tank 14; see U.S. Pat. Nos. 6,942,124 and 6,981,532. A point or protrusion (not shown) in the mounting apparatus 114 creates a vent hole in the top of the fuel stabilizer capsule, as disclosed in U.S. Pat. Nos. 6,942,124 and 6,981,532. A suitable fuel stabilizer capsule for use with the present invention is sold by Briggs and Stratton Corporation under the trademark FRESH START. Vents 118 formed in the mounting apparatus 114 allow venting of the fuel additive capsule. Each of the fuel cap embodiments disclosed herein may include the optional mounting device 114 and/or a fuel capsule 116 disposed in the mounting device.

As shown in FIGS. 2 through 7, the housing 38 further includes a receptacle 86 configured to retain the fuel vapor adsorption material 54. The receptacle 86 is divided by a plurality of internal walls 98. The internal walls 98 are integrally formed with the base wall 82 and the side wall 78 of the housing 38. The internal walls 98 provide partitioned regions 102*a*, 102*b*, and 102*c* within the receptacle 86 and define a general flow path 106 through the partitioned regions 102*a*, 102*b*, and 102*c* for fuel vapor 26 from the fuel tank 14.

Figure 4:
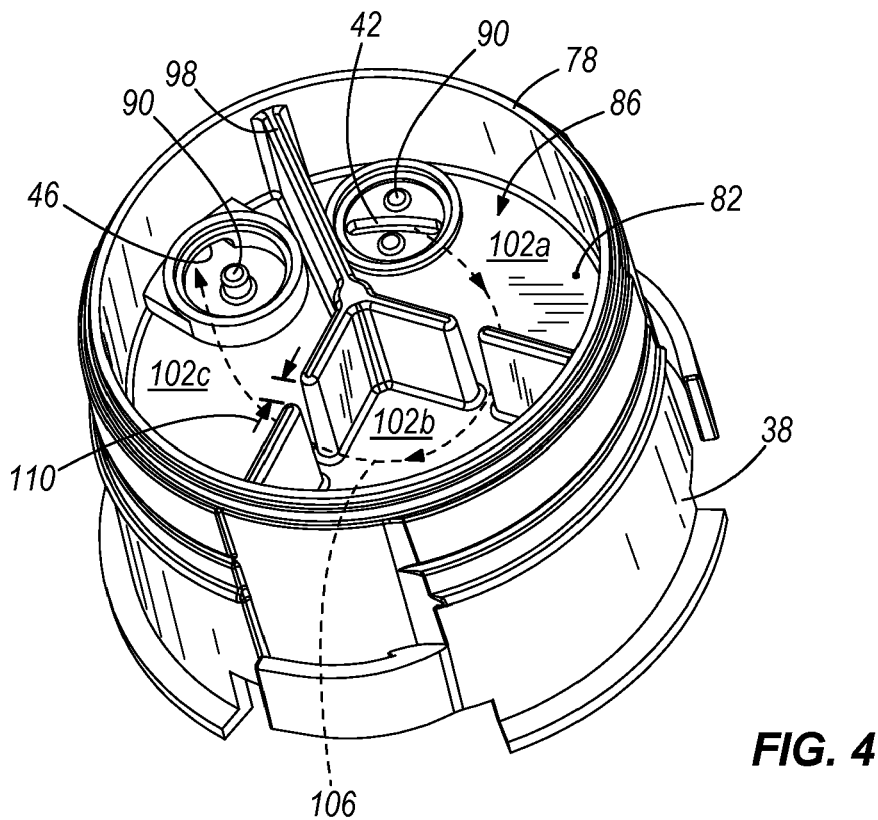
FIG. 4 is a top perspective view of the fuel tank cap housing of FIG. 2.
Figure 5:
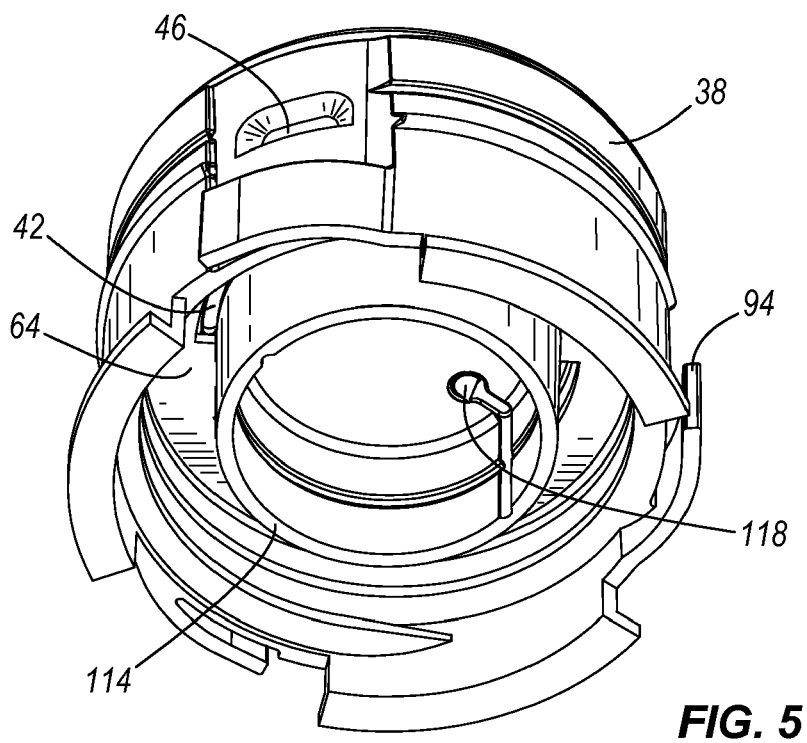
FIG. 5 is a bottom perspective view of the fuel tank cap housing of FIG. 2.
Figure 6:
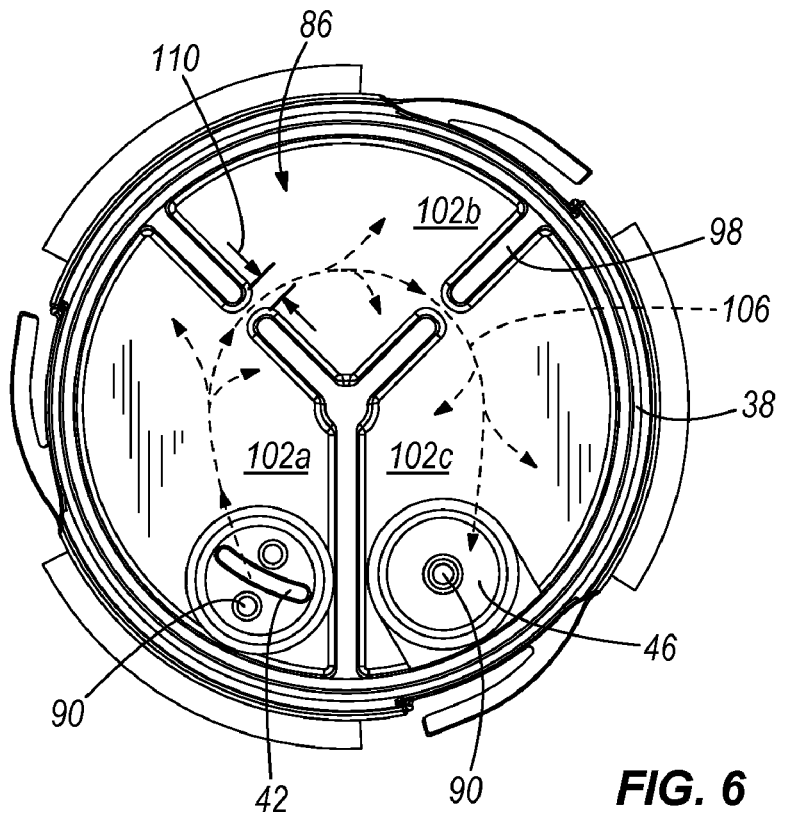
FIG. 6 is a top view of the fuel tank cap housing of FIG. 2.
Figure 7:
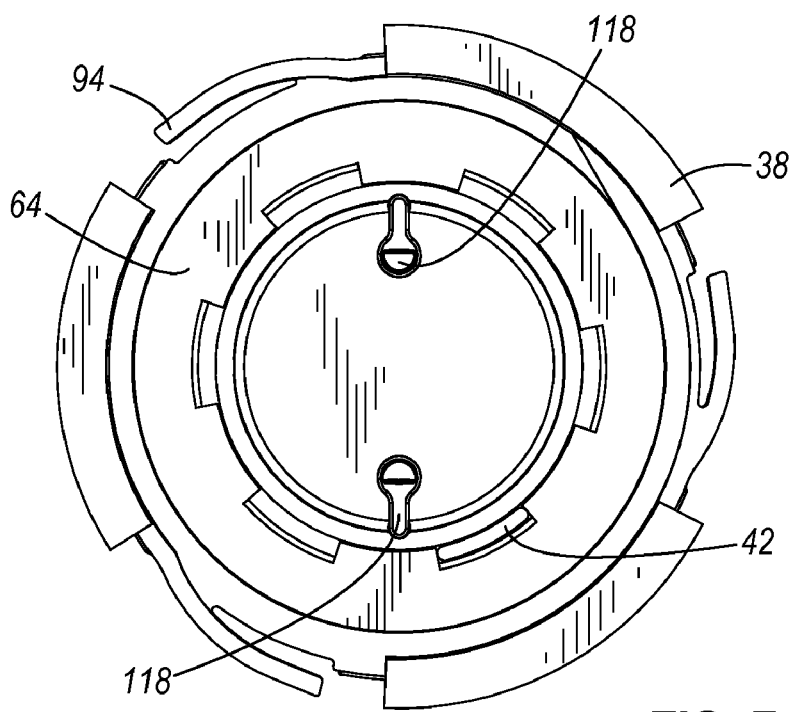
FIG. 7 is a bottom view of the fuel tank cap housing of FIG. 2

Apertures or slits 110 are formed within the internal walls 98 and further define the general flow path 106 through the partitioned regions 102*a*, 102*b*, and 102*c*. As shown in FIGS. 2, 4, and 6, the internal walls 98 are positioned to form a substantially "Y" shape. The inlet 42 and outlet 46 are disposed within different partitioned regions 102*a* and 102*c*, respectively, in order to provide a general flow path 106 through the longest volume at the center of the fuel vapor adsorption material 54.

As shown in FIGS. 4 and 6, the general flow path 106 extends from the inlet 42 through the fuel vapor adsorption material 54 and to the outlet 46 in a substantially circular flow path 106. The general flow path 106 is directed through the apertures 110 in the internal walls 98. The apertures 110 are positioned to increase adsorption efficiency by directing the flow path generally through the center of the fuel vapor adsorption material and away from the side wall 78. However, in some embodiments, the fuel vapor 26 may also diffuse from the general flow path 106 to the side wall 78 and the internal walls 98 in order to utilize more of the fuel vapor adsorption material 54.

In operation and as shown in FIGS. 3 and 4, when the engine is at rest, fuel vapor 26 is emitted from the fuel tank 14 and enters the fuel cap housing 38 through the inlet 42. The fuel vapor 26 follows the general fuel vapor flow path 106 to the outlet 46. At the outlet 46, the fluid flow is substantially fuel vapor free and exits to the atmosphere because the fuel vapor 26 is substantially retained in the fuel vapor adsorption material 54. The fuel vapor adsorption material 54 can be purged of the fuel vapor 26 by reversing the general flow path such that ambient air enters the cap housing through the outlet and proceeds along the general flow path to the inlet as a result of a reduction in fuel tank pressure. Fuel tank pressure reduction may result from conditions, for example, but not limited to natural effects, such as ambient temperature changes, or engine effects, such as fuel consumption or intake vacuum. The air, now entrained with fuel vapor, can re-enter the fuel tank vapor space through the inlet, thereby effectively purging the fuel vapor adsorption material of the fuel vapor.

Figure 8:
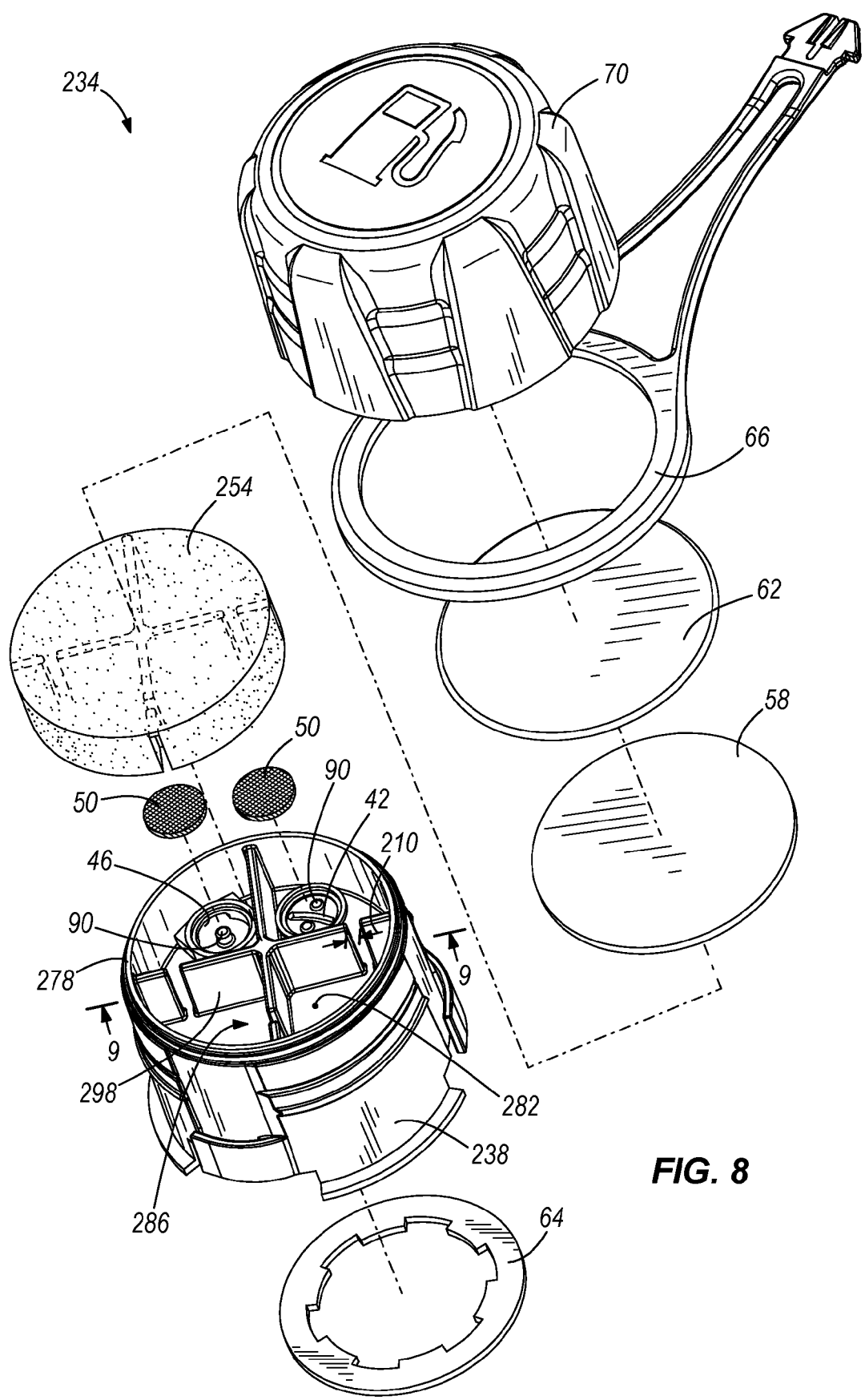
FIG. 8 is an exploded perspective view of another embodiment of the fuel tank cap of the present invention.
Figure 10:
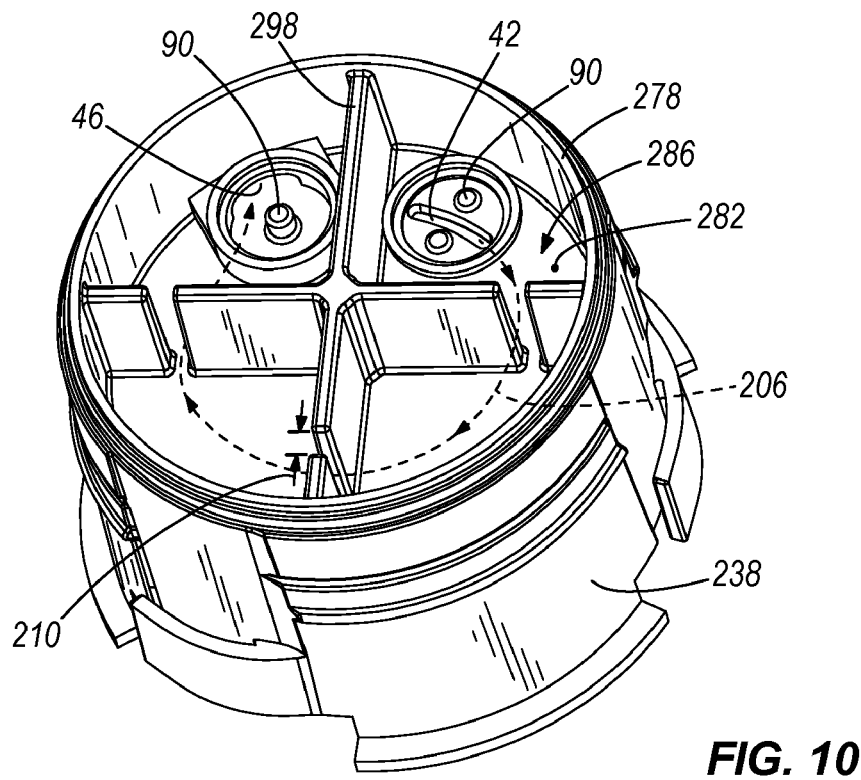
FIG. 10 is a top perspective view of the fuel tank cap housing of FIG. 8.
Figure 11:
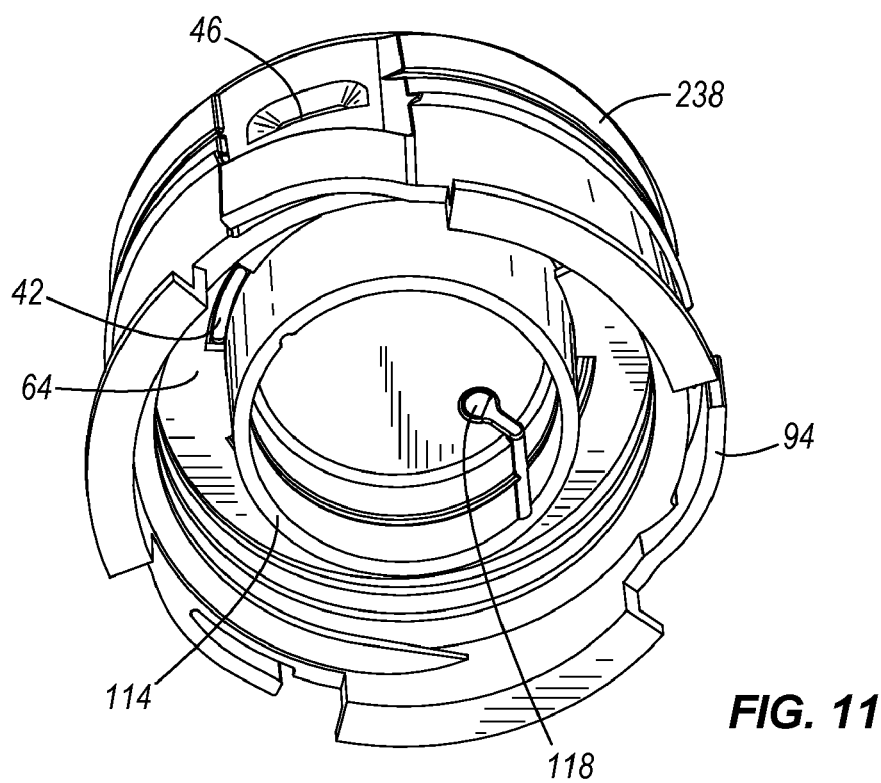
FIG. 11 is a bottom perspective view of the fuel tank cap housing of FIG. 8.
Figure 12:
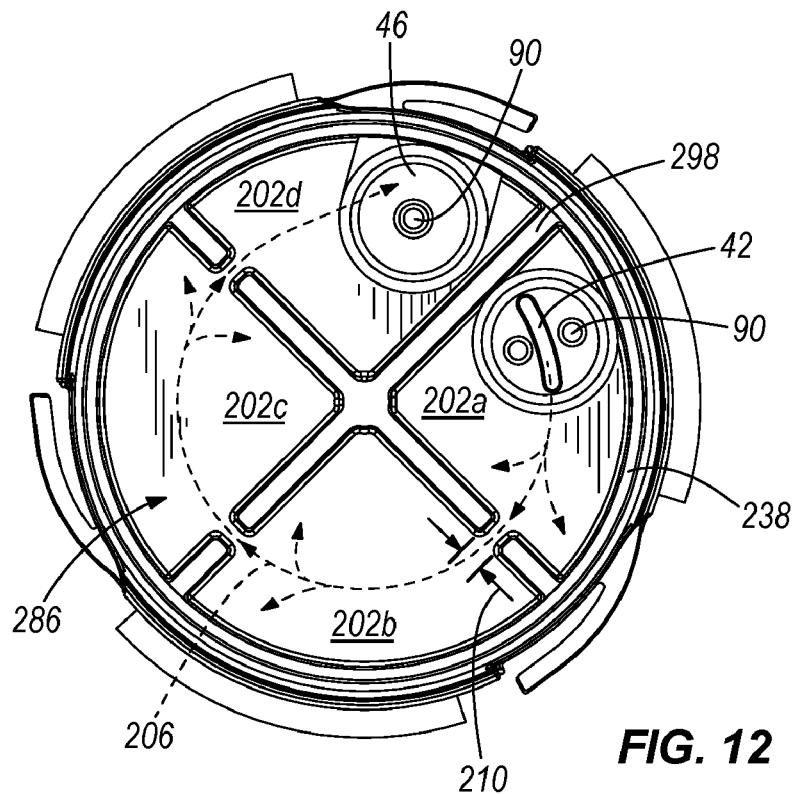
FIG. 12 is a top view of the fuel tank cap housing of FIG. 8.
Figure 13:
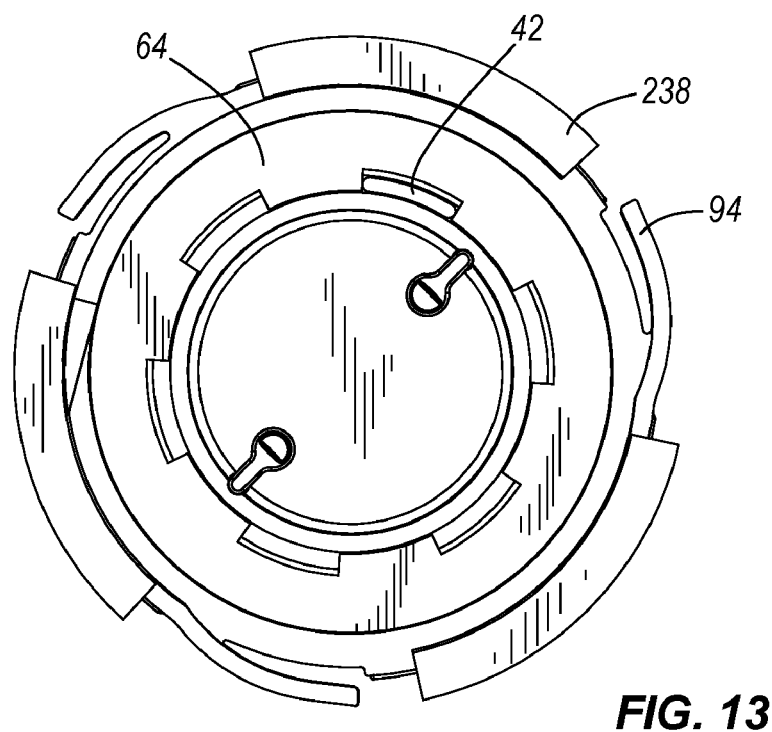
FIG. 13 is a bottom view of the fuel tank cap housing of FIG. 8.

FIGS. 8 through 13 show an alternate embodiment of the fuel tank cap 234 according to the present invention. The fuel tank cap 234 shown in FIGS. 8 through 13 includes similar structure to the fuel tank cap 34 illustrated in FIGS. 2 through 7 described above; therefore, similar components are identified by the same reference numerals, plus "200". The housing 238 has a side wall 278, a base wall 282, and a receptacle 286. More specifically, as shown in FIGS. 8, 10, and 12, the internal walls 298 are positioned within housing 238 to form a substantially "X" or cross shape. Apertures or slits 210 are formed within the internal walls 298 and further define the general flow path 206 through the partitioned regions 202a, 202b, 202c, and 202d. The inlet 42 and outlet 46 are disposed within different partitioned regions 202a and 202d, respectively, in order to provide a general flow path 206 that will provide for fuel vapor path flow 206 along the center, or longest part of the fuel vapor adsorption media 254.

Figure 14:
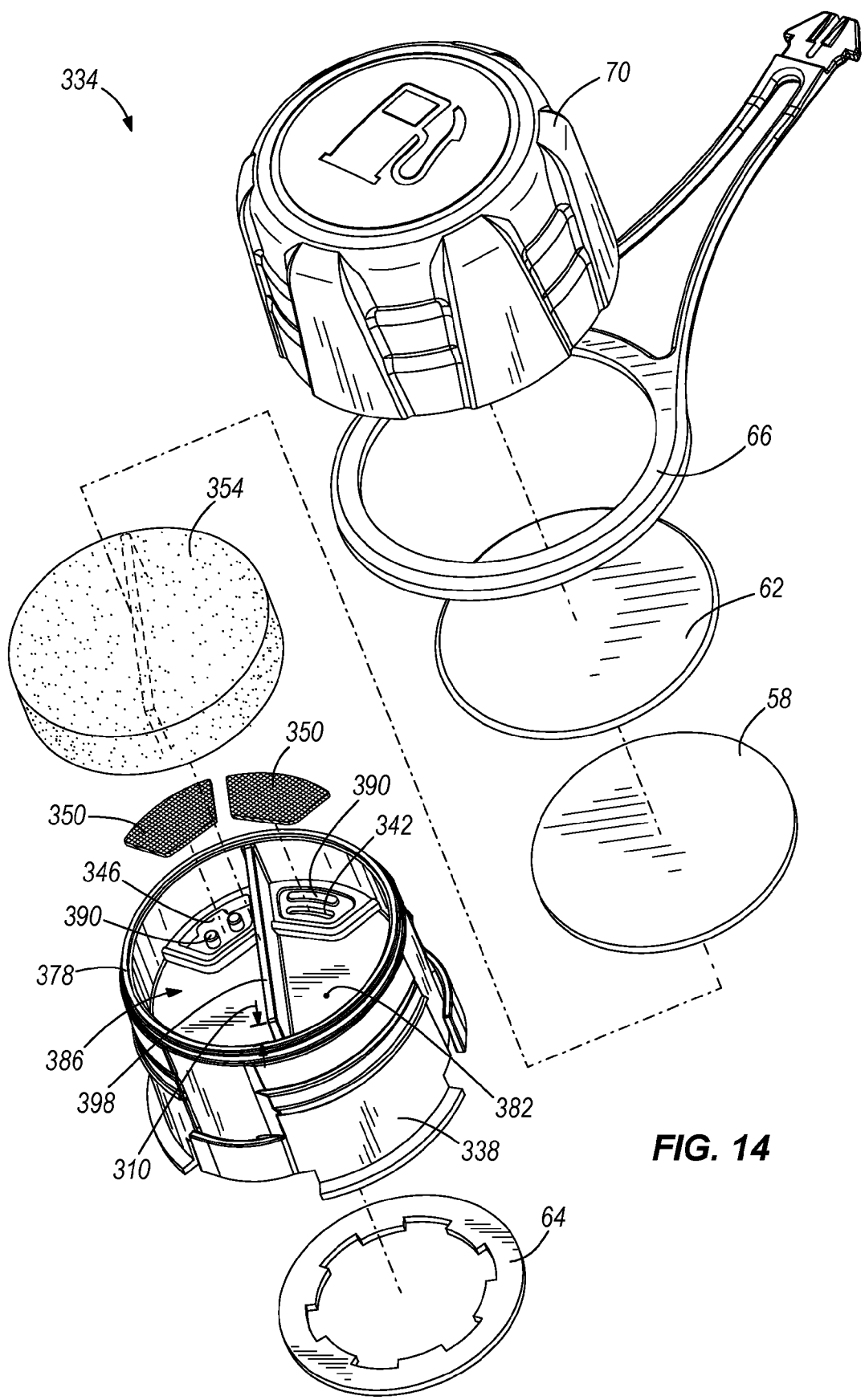
FIG. 14 is an exploded perspective view of another embodiment of the fuel tank cap of the present invention.
Figure 15:
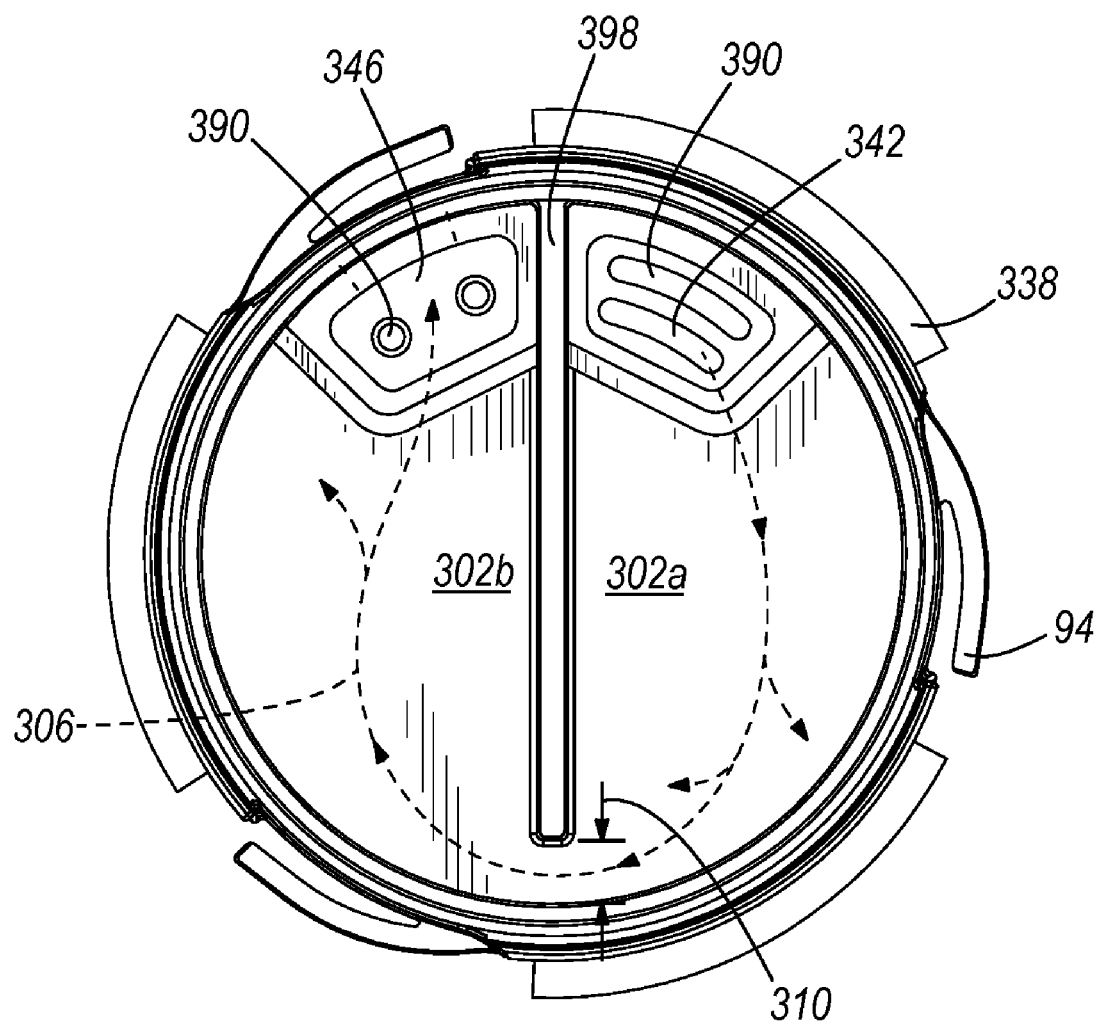
FIG. 15 is a top view of the fuel tank cap housing of FIG. 14.

FIGS. 14 and 15 show an alternate embodiment of the fuel tank cap 334 according to the present invention. The fuel tank cap 334 shown in FIGS. 14 and 15 includes similar structure to the fuel tank cap 34 illustrated in FIGS. 2 through 7 described above; therefore, similar components are identified by the same reference numerals, plus "300". The housing 338 has a side wall 378, a base wall 382, and a receptacle 386. More specifically, an internal wall 398 is positioned within housing 338 between the inlet 342 and the outlet 346 to create partitioned regions 302a and 302b. Screens 350 are positioned on receptacle side 386 of both inlet 342 and outlet 346. An aperture or slit 310 defines a general flow path 306 through partitioned regions 302a, 302b. The inlet 342 and outlet 346 are disposed within different partitioned regions 302a and 302b, respectively, in order to provide a general flow path 306 that will provide for fuel vapor path flow 306 along the center, or longest part of the fuel vapor adsorption media 354. The fuel vapor flow path 306 is substantially "U" or circular shaped.

In the illustrated embodiments, the fuel vapor flow path configurations can increase the filtering efficiency of the fuel tank cap. More specifically, the Y-shape and X-shape configurations (FIGS. 2 through 7 and FIGS. 8 through 13, respectively) of the fuel tank cap are expected to increase the filtering efficiency of the fuel tank caps 34 and 234 by approximately, twenty percent over the embodiment shown in FIGS. 14 and 15. The configuration of the internal walls essentially forces the fuel vapor flow path to extend throughout the fuel vapor adsorption material. The efficiency of fuel vapor adsorption is increased by keeping the fuel vapor flow path centralized to the volume of fuel vapor adsorption material. Accordingly, the volume of the fuel vapor adsorption material is substantially equal on all sides of the fuel vapor flow path. By keeping the flow path centralized and away from the side wall of the housing in the first and second embodiments, fuel vapor adsorption is increased. The extended flow path through the fuel vapor adsorption material also increases the surface area of contact between the fuel vapor and the fuel vapor adsorption material. Accordingly, the extended path allows for substantially all of the fuel vapor to be adsorbed by the fuel vapor adsorption material such that substantially fuel vapor free air will be emitted to the atmosphere.

Various features and advantages of the invention are set forth in the following claims.

What is claimed is:

1. A fuel tank cap that is removably coupled to a fuel tank of an engine, the fuel tank cap comprising:
   a fuel cap cover;
   a housing having a side wall, a bottom wall, and a receptacle;
   a fuel vapor adsorption material positioned within the receptacle;
   an inlet disposed near the bottom wall and configured to provide fluid communication with a fuel tank vapor space;
   an outlet disposed near the bottom wall and configured to provide fluid communication with the atmosphere;
   a radially extending internal wall adjacent the bottom wall, the inlet and the outlet being disposed on opposite sides of the internal wall; and
   at least one aperture configured to permit fuel vapor to flow in a vapor flow path from one side of the internal wall to the other side of the internal wall.

2. The fuel tank cap of claim 1, wherein the fuel vapor adsorption material includes activated carbon.

3. The fuel tank cap of claim 1, wherein the vapor flow path is substantially circular.

4. The fuel tank cap of claim 1, wherein the internal wall is a first internal wall, and wherein the fuel tank cap further includes at least two additional radially extending internal walls adjacent the bottom wall and contiguous with the first internal wall.

5. The fuel tank cap of claim 4, wherein each of at least two additional radially extending internal walls has an aperture configured to permit passage of fuel vapor through the respective internal wall.

6. The fuel tank cap of claim 5, wherein the at least two additional radially extending internal walls includes at least three radially extending internal walls, and wherein a combination of the first internal wall and the at least three additional radially extending internal walls has a substantially X-shaped configuration.

7. The fuel tank cap of claim 5, wherein a combination of the first internal wall and the at least two additional radially extending internal walls has a substantially Y-shaped configuration.

8. The fuel tank cap of claim 1, wherein the internal wall extends from the bottom wall.

9. The fuel tank cap of claim 1, wherein the inlet is disposed in the bottom wall, and wherein the outlet is disposed in one of the bottom wall and the side wall.

10. The fuel tank cap of claim 1, wherein the fuel tank cap includes a mounting apparatus configured to receive a fuel additive capsule.

11. The fuel tank cap of claim 10, wherein the mounting apparatus is positioned on an opposite side of the bottom wall from the internal wall.

12. The fuel tank cap of claim 5, wherein the apertures are non-adjacent to the side wall.

13. A fuel tank cap that is removably coupled to a fuel tank of an engine, the fuel tank cap comprising:
 a fuel cap cover;
 a housing having a side wall, a bottom wall, and a receptacle;
 a fuel vapor adsorption material positioned within the receptacle;
 a fuel vapor inlet disposed near the bottom wall and configured to provide fluid communication with a fuel tank vapor space;
 an outlet disposed near the bottom wall and configured to provide fluid communication with the atmosphere;
 a radially extending internal wall adjacent the bottom wall, the inlet and the outlet being disposed on opposite sides of the internal wall, the internal wall creating a first region on one side of the internal wall and a second region on the other side of the internal wall; and
 at least one aperture configured to permit fuel vapor to flow in a fuel vapor flow path from the first region to the second region.

14. The fuel tank cap of claim 13, wherein the fuel vapor adsorption material includes activated carbon.

15. The fuel tank cap of claim 13, wherein the fuel vapor flow path is substantially circular.

16. The fuel tank cap of claim 13, wherein the internal wall is a first internal wall, and wherein the fuel tank cap further includes at least two additional radially extending internal walls adjacent the bottom wall and contiguous with the first internal wall.

17. The fuel tank cap of claim 16, wherein each of at least two additional radially extending internal walls has an aperture configured to permit passage of fuel vapor through the respective internal wall.

18. The fuel tank cap of claim 17, wherein the at least two additional radially extending internal walls includes at least three radially extending internal walls, and wherein a combination of the first internal wall and the at least three additional radially extending internal walls has a substantially X-shaped configuration.

19. The fuel tank cap of claim 17, wherein a combination of the first internal wall and the at least two additional radially extending internal walls has a substantially Y-shaped configuration.

20. The fuel tank cap of claim 13, wherein the internal wall extends from the bottom wall.

21. The fuel tank cap of claim 13, wherein the inlet is disposed in the bottom wall, and wherein the outlet is disposed in one of the bottom wall and the side wall.

22. The fuel tank cap of claim 13, wherein the fuel tank cap includes a mounting apparatus configured to receive a fuel additive capsule.

23. The fuel tank cap of claim 22, wherein the mounting apparatus is positioned on an opposite side of the bottom wall from the internal wall.

24. The fuel tank cap of claim 17, wherein the apertures are non-adjacent to the side wall.

25. A fuel tank cap that is removably coupled to a fuel tank of an engine, the fuel tank cap comprising:
 a housing having a bottom wall;
 a receptacle formed in the housing;
 an inlet disposed near the bottom wall and configured to provide fluid communication with a fuel tank vapor space;
 an outlet disposed near the bottom wall and configured to provide fluid communication with the atmosphere;
 a fuel vapor adsorption material positioned within the receptacle;
 a radially extending internal wall extending into the receptacle, the inlet and the outlet being disposed on opposite sides of the internal wall; and
 at least one aperture configured to permit fuel vapor to flow from one side of the internal wall to the other side of the internal wall;
 wherein the internal wall is configured to direct fuel vapor through the fuel vapor adsorption material in a substantially circular fuel vapor flow path.

26. The fuel tank cap of claim 25, wherein the fuel vapor adsorption material includes activated carbon.

27. The fuel tank cap of claim 25, wherein the internal wall is a first internal wall, and wherein the fuel tank cap further includes at least two additional radially extending internal walls extending into the receptacle and contiguous with the first internal wall.

28. The fuel tank cap of claim 27, wherein each of at least two additional radially extending internal walls has an aperture configured to permit passage of fuel vapor through the respective internal wall.

29. The fuel tank cap of claim 28, wherein at least two additional radially extending internal walls includes at least three radially extending internal walls, and wherein a combination of the first internal wall and the at least three additional radially extending internal walls has a substantially X-shaped configuration.

30. The fuel tank cap of claim 28, wherein a combination of the first internal wall and the at least two additional radially extending internal walls has a substantially Y-shaped configuration.

31. The fuel tank cap of claim 25, wherein the fuel tank cap includes a mounting apparatus configured to receive a fuel additive capsule.

32. The fuel tank cap of claim 31, wherein the mounting apparatus is positioned on an opposite side of the bottom wall from the internal wall.

33. The fuel tank cap of claim 28, wherein the housing includes a side wall adjacent the bottom wall, and wherein the apertures are non-adjacent to the side wall.

* * * * *